(12) United States Patent
Grosser et al.

(10) Patent No.: US 6,591,933 B1
(45) Date of Patent: Jul. 15, 2003

(54) APPARATUS AND METHOD FOR METERING IN A MOTOR VEHICLE

(75) Inventors: Martin Grosser, Korntal-Muenchingen (DE); Claus Hinrichsen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/911,494

(22) Filed: Aug. 14, 1997

(30) Foreign Application Priority Data

Aug. 14, 1996 (DE) .......................... 196 32 753

(51) Int. Cl.⁷ .............................................. B60K 28/16
(52) U.S. Cl. ........................................ 180/284; 701/86
(58) Field of Search ................................ 180/284, 282, 180/283; 701/71, 86, 92, 76; 123/185 DB

(56) References Cited

U.S. PATENT DOCUMENTS

| | | | | |
|---|---|---|---|---|
| 3,911,391 A | * | 10/1975 | Held et al. | 180/282 |
| 3,994,360 A | * | 11/1976 | Leibold | 180/282 |
| 4,245,598 A | * | 1/1981 | Ruhl | 123/333 |
| 4,917,208 A | * | 4/1990 | Komoda | 180/284 |
| 4,933,857 A | * | 6/1990 | Hashiguchi et al. | 701/86 |
| 5,033,574 A | * | 7/1991 | Kushi et al. | 180/197 |
| 5,043,898 A | * | 8/1991 | Yoshino | 180/197 |
| 5,091,857 A | * | 2/1992 | Katayama et al. | 180/284 |
| 5,124,922 A | * | 6/1992 | Akiyama | 701/92 |
| 5,201,385 A | | 4/1993 | Browne | |
| 5,369,580 A | * | 11/1994 | Monji et al. | 180/282 |
| 5,372,411 A | * | 12/1994 | Gertsenmaier et al. | 180/282 |
| 5,441,304 A | * | 8/1995 | Zygutis et al. | 180/282 |
| 5,594,647 A | * | 1/1997 | Yasuda et al. | 180/282 |
| 5,682,316 A | * | 10/1997 | Hrovat et al. | 701/86 |
| 5,742,918 A | * | 4/1998 | Ashrafi et al. | 701/71 |
| 5,797,374 A | * | 8/1998 | Minagawa et al. | 123/497 |

FOREIGN PATENT DOCUMENTS

| | | |
|---|---|---|
| DE | 42 12 337 | 10/1993 |
| DE | 44 40 700 A1 | 6/1995 |
| DE | 44 40 700 | 6/1995 |
| EP | 0 321 894 | 6/1989 |
| GB | 2 162 250 A | 1/1986 |
| WO | 92/10667 | 6/1992 |

OTHER PUBLICATIONS

"Bosch Technical Reports", vol. 7, (1980), No. 2.
"Bosch FDR vehicle dynamics regulation system" (FDR–Fahrdynamikregelung von Bosch), ATZ Automobiltechnisches Zeitschrift 96 (1994).

* cited by examiner

Primary Examiner—Avraham Lerner
(74) Attorney, Agent, or Firm—Kenyon & Kenyon

(57) ABSTRACT

A system and method for fuel metering in a motor vehicle in which the fuel in a reservoir has a definable pressure. A second device for reducing the pressure and a first device for issuing a signal relevant to vehicle safety are provided. The pressure is reduced by the second device in response to the signal relevant to vehicle safety. The first device is configured in such a way that, in order to increase vehicle stability, the braking effect for at least one vehicle wheel brake can be modified, and the signal relevant to vehicle safety is issued as a function of a definable modification of the braking effect.

2 Claims, 2 Drawing Sheets

APPARATUS AND METHOD FOR METERING IN A MOTOR VEHICLE

FIELD OF THE INVENTION

The present invention relates to an apparatus and a method for fuel metering in a motor vehicle.

BACKGROUND INFORMATION

In motor vehicles having an internal combustion engine, fuel is delivered out of a fuel container with the aid of an electric fuel pump, and conveyed via fuel lines to the injection valves. In internal combustion engines with high-pressure injection, in particular in internal combustion engines with auto-ignition, the electric fuel pump is followed by a further pump which generates a very high pressure in a high-pressure region of the fuel supply system that communicates with the injection valves.

German Patent Application No. 44 40 700 describes a high-pressure fuel injection system in which the acceleration which is detected by a sensor is compared with a defined value which, if exceeded, causes an accident such as a collision to be diagnosed. If the sensed acceleration exceeds the defined value, the pressure in the high-pressure region is sharply reduced, so that in the event of damage to the high-pressure line due to a severe impact, discharge of fuel at high pressure is prevented. The reduction in the high pressure has therefore already started in the time frame of an impact.

Antilock braking control systems per se are known as described, for example, in Bosch Technical Reports, Vol. 7, (1980), No. 2. In such antilock braking systems, the braking systems of the vehicle wheels are activated in such a way that a change in braking effect, generally in braking pressure, occurs as a function of an instability value. This instability value is generated as a function of the detected wheel motion, generally of the wheel rotation. This instability value is, in particular, a combination of the instantaneous wheel circumference deceleration or wheel circumference acceleration and the brake slippage.

Conventional vehicle dynamics control systems include a variable which influences and/or represents the dynamics of the vehicle, for example the yaw angle velocity, the steering angle, and/or the transverse acceleration of the vehicle, is detected. As a function of these detected variables, the braking systems of the wheels are activated so as to increase vehicle stability. Such conventional system is described, for example, in "Bosch FDR vehicle dynamics regulation system" (FDR-Fahrdynamikregelung von Bosch), ATZ Automobiltechnisches Zeitschrift 96 (1994).

It is the object of the present invention to eliminate, in reliable and cost-effective fashion, the danger of fuel discharge under high pressure.

SUMMARY OF THE INVENTION

The present invention relates to a system for fuel metering in a motor vehicle in which the fuel in a reservoir has a definable pressure. According to the present invention, a means (or a system) for reducing the pressure and a further means (or another system) for issuing a signal relevant to vehicle safety are provided. In this context, the pressure is reduced in reaction to the signal relevant to vehicle safety.

The present invention provides the means for issuing the signal relevant to vehicle safety that are configured in such a way that, in order to increase vehicle stability, the braking effect can be modified via at least one vehicle wheel brake, the signal relevant to vehicle safety being issued as a function of a definable modification of braking effect.

The present invention is based on the fact that the safety systems which affect the vehicle brakes go into action prior to a possible accident or a possible collision in which the high-pressure portion of the fuel delivery system might in some circumstances be damaged. If the fuel pressure is decreased as a function of such brake actions, the result is a relatively early safety-related reduction in fuel pressure. An engine torque reduction possibly associated with the pressure reduction is of little relevance in this context. In addition, the pressure reduction can be actuated, within certain limits, in such a way that no substantial reduction in engine torque occurs. For this purpose, for example, the fuel injection duration can be extended as the pressure is reduced.

In modern motor vehicle systems, the engine control device is generally connected by using a bus system to the antilock or vehicle dynamics control device which acts on the brakes. An essential advantage of the present invention is the fact that the safety advantage achieved by the present invention can be attained solely by using a specific software intervention that can be implemented relatively economically.

In an advantageous embodiment of the present invention, second means can be configured as an antilock braking system (ABS), in which any incipient locking of a vehicle wheel is detected. In antilock braking systems, the braking effect at the wheel is modified, in response to a detection of incipient locking of a definable magnitude, in such a way that the braking effect is kept constant or is reduced. In this embodiment of the present invention, provision is made for the signal relevant to vehicle safety to be issued as a function of that modification. In this embodiment, therefore, the fuel pressure can be reduced when incipient locking is detected, i.e. at the onset of active ABS control operation.

In an ABS system, wheel slippage and/or wheel deceleration are generally determined at least as a function of detected wheel rotation velocities. To detect incipient locking, the determined wheel slippage and/or determined wheel deceleration are compared with threshold values.

In a further embodiment of the present invention, the second means to be configured as a vehicle dynamics control system (FDR), in which the yaw behavior and/or transverse motion behavior of the vehicle are detected and compared with specific setpoints and/or reference profiles. In this context, when a deviation of a certain magnitude between the detected behavior and the pertinent reference profile is recognized, the braking effect at particular wheels is modified in such a way that the deviation is minimized. In this case the signal relevant to vehicle safety is issued as a function of the modification.

With such FDR systems, provision is generally made for the setpoints and/or reference profiles to be determined at least as a function of the detected longitudinal vehicle speed and the detected steering movement.

The aforesaid modifications of the braking effect can be implemented by changing the brake pressure in the wheel brakes, or by means of a brake actuated by an electric motor.

The subject of the present invention includes a method for fuel metering in a motor vehicle in which the fuel in a reservoir has a definable pressure, such that a signal relevant to vehicle safety is issued and the pressure is reduced in reaction to the signal relevant to vehicle safety. The method according to the present invention provides that in order to increase vehicle stability, the braking effect at least one vehicle wheel brake can be modified, and the signal relevant to vehicle safety is issued as a function of a definable modification of braking effect.

DETAILED DESCRIPTION

Figure 1:
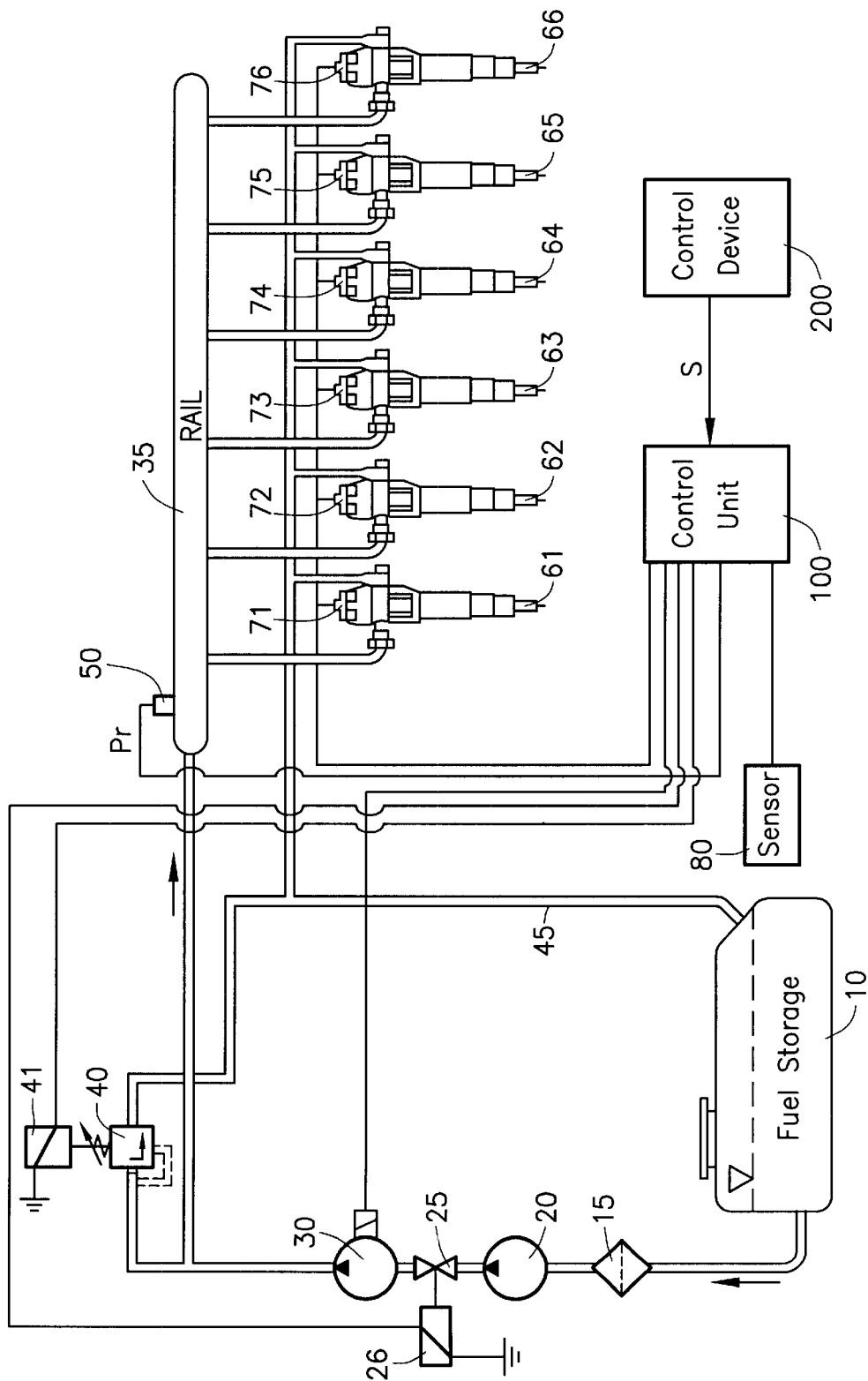
FIG. 1 shows a block diagram of an apparatus according to the present invention.

FIG. 1 shows those components of a fuel supply system of an internal combustion engine with high-pressure fuel injection that are necessary for an understanding of the exemplary embodiment according to the present invention. The system shown in FIG. 1 is preferably referred to as a common rail system. A fuel storage container or reservoir is designated as 10, which communicates, via a fuel delivery line with a filter 15, a predelivery pump 20, a shutoff valve 25, and a high-pressure delivery pump 30, with a rail 35.

A pressure regulating valve 40 (or pressure limiting valve) is arranged in the fuel delivery line between high-pressure delivery pump 30 and rail 35. The delivery line can be connected using the regulating valve 40 to a return line 45. The pressure regulating valve connects the high-pressure region to a low-pressure region. Fuel passes through return line 45 back into tank 10.

Shutoff valve 25 can be actuated by using a coil 26. Valve 40 can correspondingly be activated by using another coil 41. A sensor 50 is arranged on rail 35. This sensor 50 is preferably a pressure sensor which generates a signal that corresponds to the fuel pressure $p_r$ in the rail, and thus to the pressure in the high-pressure region.

Rail 35 communicates with the individual injectors 61 to 66 via one respective line. The injectors 61 to 66 include respective solenoid valves 71 to 76 for controlling the fuel flow through the injectors, so that an injection duration can be determined. The injectors 61 to 66 also communicate with return line 45 via respective connections.

The output signal $p_r$ of pressure sensor 50 and the output signals of further sensors 80 arrive at a control unit 100 which in turn controls solenoid valves 71 to 76, coil 26 of the shutoff valve 25, coil 41 of the pressure regulating valve 40, and the high-pressure delivery pump 30.

The device operates in such a way that predelivery pump 20, which can be configured as an electric fuel pump or mechanical pump, delivers the fuel present in fuel storage container 10 via a filter 15 to high-pressure delivery pump 30. High-pressure delivery pump 30 delivers the fuel into rail 35, where it builds up a pressure which is between approximately 100 and 2000 bar.

Arranged between high-pressure delivery pump 30 and predelivery pump 20 is a shutoff valve 25 which can be activated by control unit 100 in order to interrupt the fuel flow. A reduction in fuel pressure can be effected by activating pressure regulating valve 40.

On the basis of the signals of various sensors 80, control unit 100 generates control signals to act on solenoid valves 71 to 76 of injectors 61 to 66. A beginning and an end of fuel injection into the internal combustion engine are controlled by opening and closing solenoid valves 71 to 76.

The pressure $p_r$ of the fuel in rail 35 and thus in the high-pressure region is detected using pressure sensor 50. Based on this pressure, control unit 100 calculates a signal to act on pressure regulating valve 40. The pressure is preferably regulated, by activation of pressure regulating valve 40, to a definable value which depends, among other factors, on operating conditions of the internal combustion engine which are detected by sensor 80.

Signal S relevant to vehicle safety is conveyed to control unit 100 from the antilock braking control device (ABS) or from the vehicle dynamics control device (FDR) 200.

Figure 2:
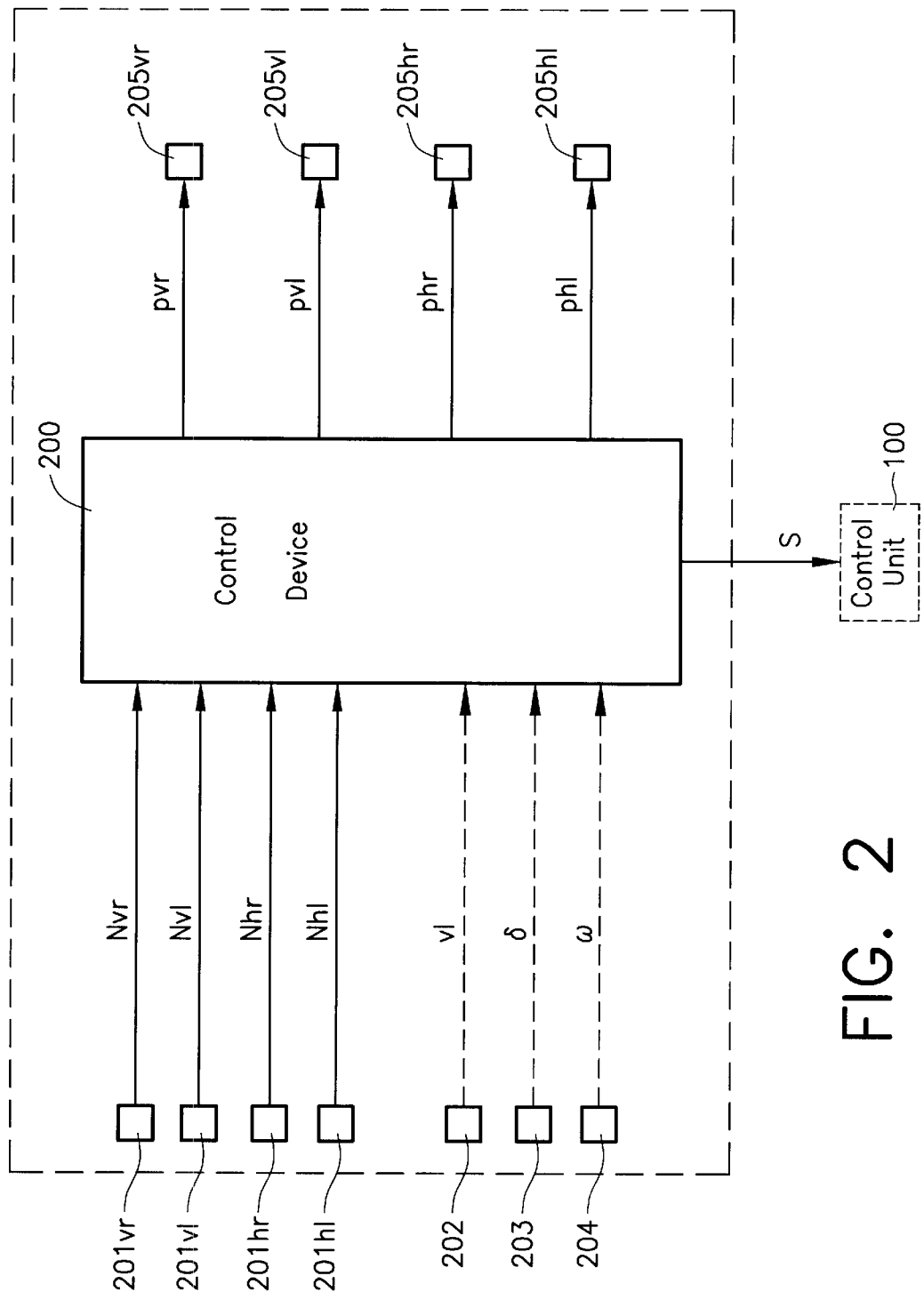
FIG. 2 shows a block diagram of a control device of the apparatus according to the present invention.

FIG. 2 shows one such control device 200. The output signals of wheel rotation speed sensors 201$vr$, 201$vl$, 201$hr$, and 201$hl$, which sense the wheel rotation speed of the vehicle wheels, are conveyed to control device 200. In addition, the longitudinal vehicle speed Vl is detected by a means (or a device) 202. The longitudinal vehicle speed is generally calculated as a reference speed from the sensed wheel rotation speeds.

If the control device 200 is configured as an ABS control device, an instability value is formed as a function of wheel deceleration (from the wheel rotation speed), wheel slippage (from the wheel rotation speed and longitudinal vehicle speed) and the particular wheel rotation speed and the longitudinal vehicle speed. This instability value is compared with a threshold value. If the instability value exceeds a threshold value, incipient locking of the wheel is recognized, whereupon brake pressure pvr, pvl, phr, and phl in wheel brakes 205 hr, 205$vl$, 205$hr$, and 205$hl$ is kept constant or decreased.

If control device 200 is configured as a vehicle dynamics control device (FDR), the steering angle δ currently being held by the driver (obtained using a steering angle sensor 203) and the yaw angle velocity ω (angular rotation velocity about the vehicle's vertical axis) are detected in addition to the variables mentioned above. The detected yaw angle velocity ω is then conventionally regulated via braking actions at individual wheels, to conform to setpoints or reference profiles. In this context, the setpoints or reference profiles are determined as a function of steering angle δ and vehicle speed Vl.

If incipient blocking at one wheel and/or excessive deviation of the actual yaw behavior from the reference yaw behavior are detected in control device 200, signal S that is relevant to vehicle safety is issued to engine control unit 100 in addition to the corresponding braking actions which increase vehicle safety. It is not absolutely necessary, however, for the signal S to correspond directly to a braking action. Signal S that is relevant to vehicle safety can be issued only in the case of incipient locking and/or a yaw velocity control deviation of a certain magnitude. Therefore, signal S is not issued until, based on wheel behavior and/or vehicle dynamics, an accident and therefore damage to fuel rail 35 are probable.

In engine control unit 100, issuance of signal S causes the pressure in rail 35 to be decreased, immediately or later. This can be done by interrupting fuel delivery by closing shutoff valve 25, and/or by at least partly opening pressure regulating valve 40.

The decrease in pressure $p_r$ in rail 35 can be compensated for in a certain pressure region, with respect to engine torque, by modifying the injection duration. In other words, as the pressure is reduced, the injection duration is selected in such a way that engine torque is reduced only slightly or not at all by the pressure drop.

What is claimed is:

1. An apparatus for metering fuel in a motor vehicle, wherein the motor vehicle includes a vehicle safety system that modifies a braking effect on at least one vehicle wheel brake and wherein the vehicle safety system, upon detection of a safety condition, generates a safety signal relating to a safe operation of the motor vehicle, comprising:

a system reducing a fuel pressure in a rail in response to the safety signal;

wherein the vehicle safety system includes a vehicle dynamics control (FDR) system, wherein the FDR system detects and compares at least one of a yaw behavior condition and a transverse motion behavior condition of the motor vehicle with at least one of predetermined setpoints and reference profiles, and wherein, when a deviation having a predefined magnitude between the detected behavior condition and a pertinent reference profile is detected, the braking effect at preselected wheels is modified by the vehicle safety system to minimize the deviation, the safety signal being generated as a function of the braking effect.

2. The apparatus according to claim 1, wherein at least one of the predetermined setpoints and the reference profiles is determined as a function of at least one of a detected longitudinal vehicle speed and a detected steering movement.

* * * * *